United States Patent Office 3,323,563
Patented June 6, 1967

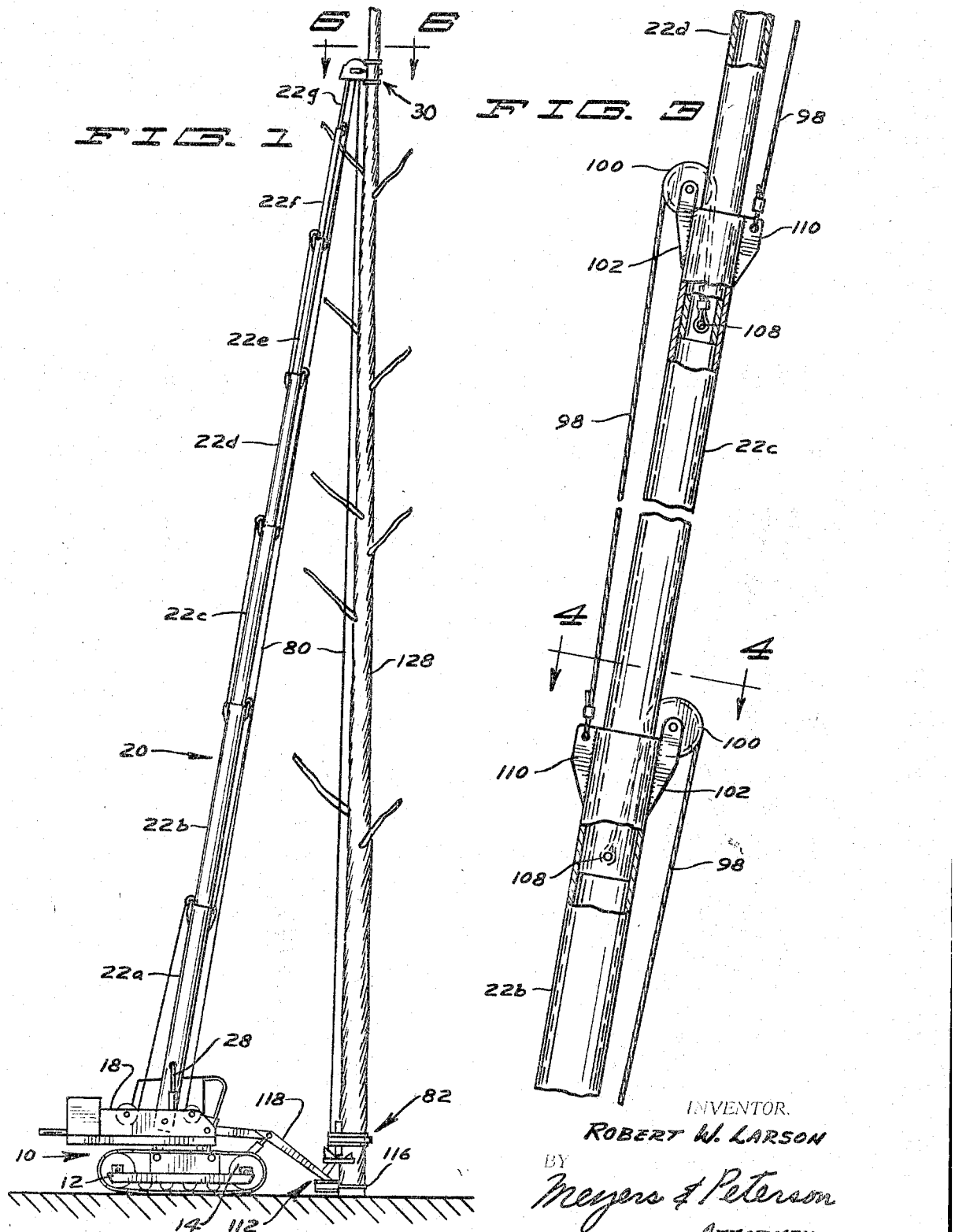

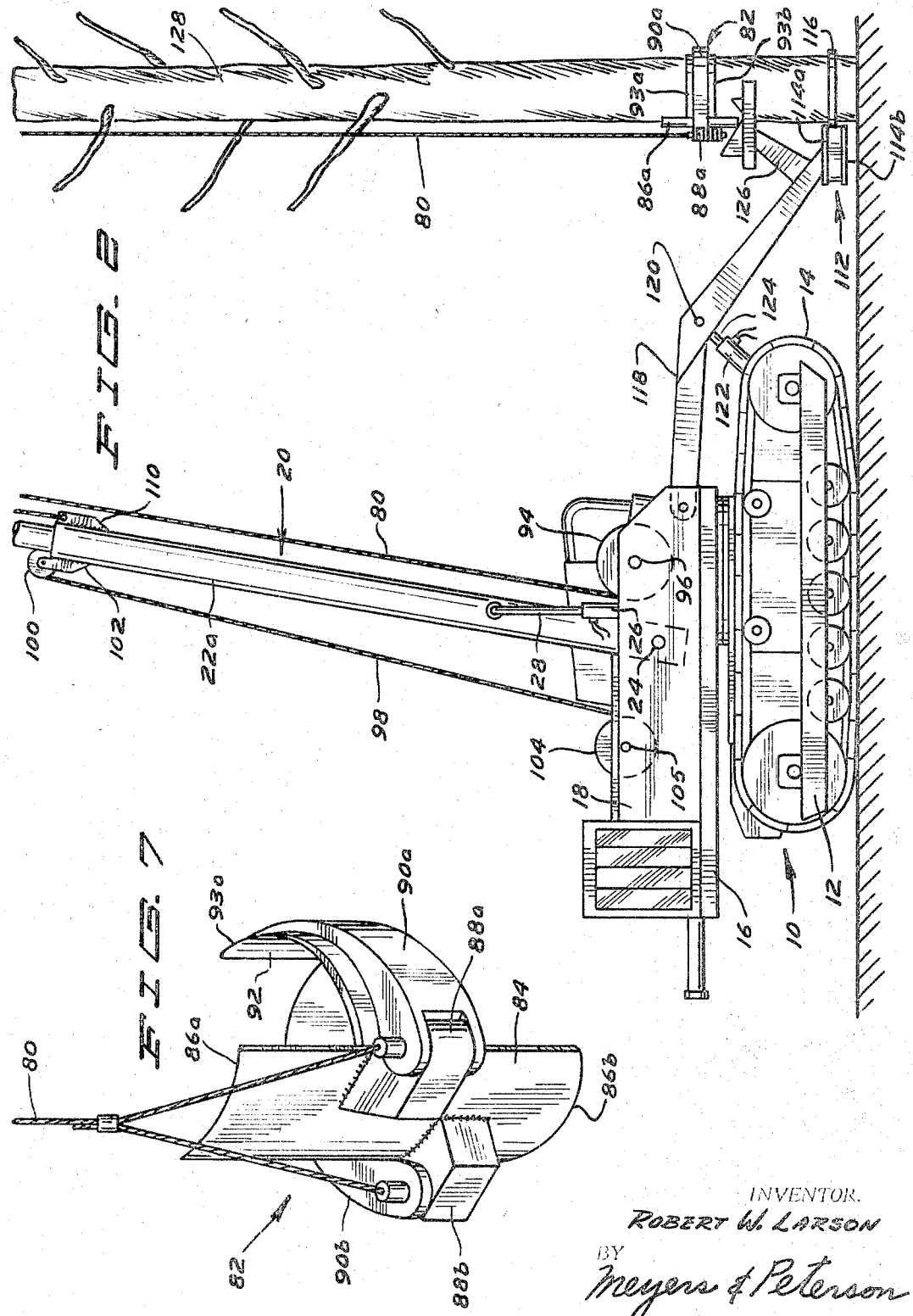

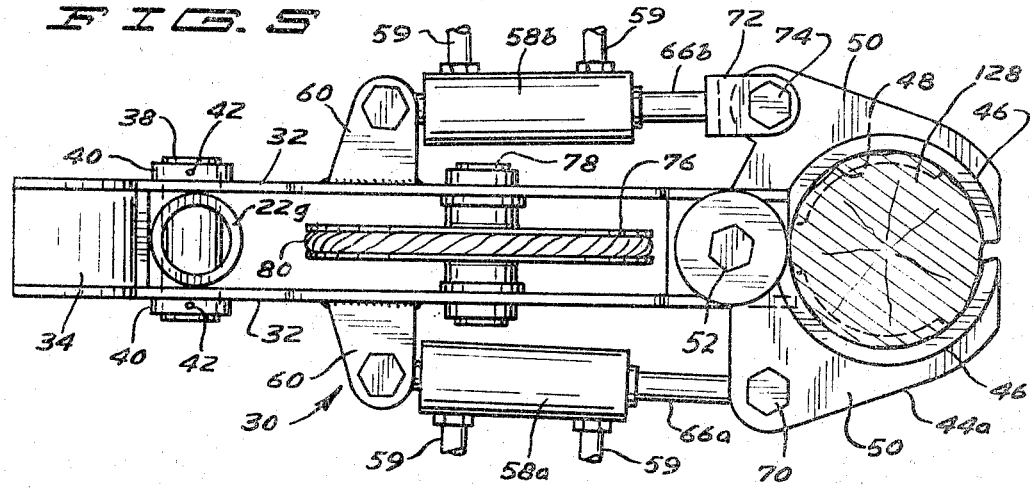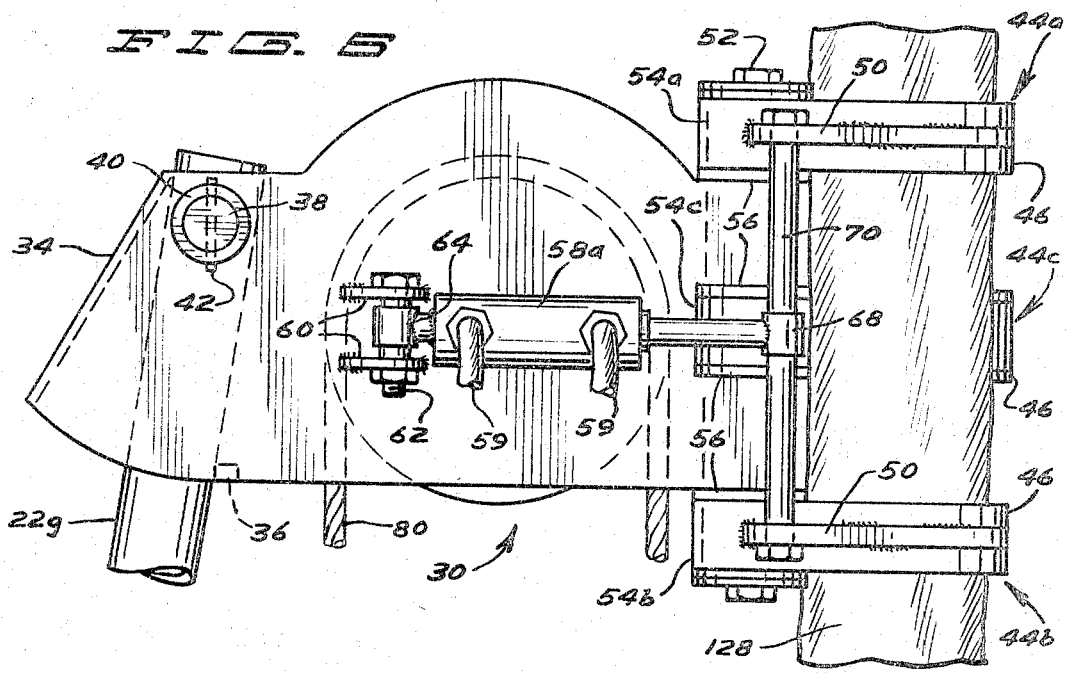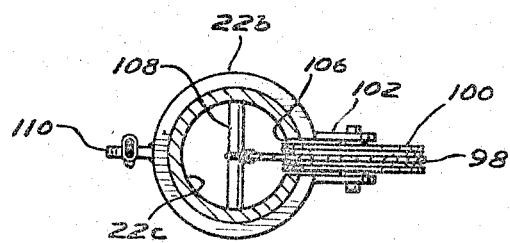

3,323,563
DELIMBING APPARATUS FOR TALL TREES
Robert W. Larson, Ashland, Wis., assignor to Beloit, Corporation, Beloit, Wis., a corporation of Wisconsin
Filed May 28, 1965, Ser. No. 459,615
8 Claims. (Cl. 144—2)

This invention relates generally to logging equipment, and pertains more particularly to apparatus for delimbing tall trees.

In Larson et al. patent application Ser. No. 285,114, filed June 3, 1963 now Patent No. 3,252,487 for Apparatus for Delimbing and Felling Trees, in which I am a co-inventor and which is assigned to the same assignee as the instant application, apparatus is described and claimed for shearing limbs from standing trees. The present invention relates generally to the basic technique disclosed in said Larson et al. application but deals more specifically with apparatus capable of removing limbs from exceptionally tall trees. In this regard, the present invention has for an object the provision of a telescopic boom assembly that can be extended to a relatively great height and through the agency of a clamping mechanism at the upper end of the boom assembly a direct clamping action can be effected with the upper portion of a standing tree so as to enable a delimbing head to be pulled upwardly by a cable along the length of the tree. Consequently, the invention has for an aim the provision of relatively lightweight equipment which will be less costly than that depicted in said copending application for a given height of tree to be delimbed. Stated somewhat differently, the apparatus constituting the present invention is less massive and possesses a high degree of maneuverability.

The above and other objects and advantages of my invention will more fully appear from the following description, made in connection with the accompanying drawings, wherein like reference characters refer to the same or similar parts throughout the several views and in which:

FIGURE 1 is a side elevational view of delimbing apparatus constructed in accordance with the teachings of the present invention, the boom assembly being completely extended and the clamping mechanism at the upper end thereof shown in clamping relationship with the upper portion of a standing tree preparatory to raising the delimbing head illustrated near the bottom of said tree;

FIGURE 2 is a side elevational view, fragmentarily depicted, corresponding to FIGURE 1, the view being on a somewhat larger scale in order to show to better advantage certain portions of the apparatus;

FIGURE 3 is a fragmentary view also corresponding to FIGURE 1 but illustrating the manner in which several of the boom sections are telescopically received with respect to each other;

FIGURE 4 is a sectional view taken in the direction of line 4—4 of FIGURE 3;

FIGURE 5 is a top plan view looking down on the clamping mechanism, the view being taken in the direction of line 5—5 of FIGURE 1;

FIGURE 6 is a side elevational view of the clamping mechanism pictured in FIGURE 5, and FIGURE 7 is a perspective view of a relatively simple delimbing head that can be utilized when carrying out the teachings of the invention.

Referring now in detail to the drawings, a typical vehicle 10 has been chosen to illustrate the invention. The vehicle 10 includes a chassis 12 equipped with endless tracks 14. Surmounting the chassis 12 is a swing platform 16 to which the lower edges of a pair of laterally spaced upstanding side plates 18 are secured, as by welding.

A boom assembly has been designated generally by the reference numeral 20 and is composed of a plurality of telescopically received tubular members which have been labeled 22a–g. These tubular members are preferably of lightweight and relatively thin metallic stock, the lightweight characteristics being particularly desirable inasmuch as the boom assembly need only carry a relatively light load at its upper end. The reason for this will become manifest as the description progresses. While not important to a practicing of the present invention, the boom assembly 20 is rendered pivotal and for this purpose a shaft 24 extends through the two upstanding side plates 18 and the lowermost tubular member 22a. In furtherance of the angular adjustment to be made with respect to the boom assembly 20, there is a hydraulic cylinder 26 having an upwardly extending piston rod 28 that is pivotally connected to the lowermost tubular member 22a. In this way, a simplified arrangement is provided for raising and lowering the boom assembly through various angles. It is to be borne in mind, though, that the arrangement depicted is made simple for the sake of drafting expediency and other pivotal mounting means can be utilized when circumstances so dictate.

Carried at the extreme upper end of the boom assembly 20, more specifically, at the free end of the uppermost tubular member 22g, is a clamping mechanism identified generally by the reference numeral 30. From FIGURE 5, it will be discerned that the mechanism 30 includes a pair of parallel side plates 32 having a rearwardly disposed inclined plate 34 extending therebetween and also a transverse stop element 36 also extending therebetween at the lower edges of said plates 32. A transverse pin 38 passes through the upper end of the tubular member 22g, and by reason of a pair of retaining collars 40 having pins 42 extending therethrough as well as the projecting ends of said pin 38 the entire clamping mechanism 30 is mounted for limited pivotal movement at the upper end of said boom assembly 20. In other words, the clamping mechanism 30 may assume any angular position governed by the transverse stop element 36 in one extreme angular position and the rear plate 34 in the other.

Continuing with the description of the clamping mechanism 30, it will now be explained that a pair of upper and lower arcuate jaws 44a and 44b, respectively, are employed and that an intermediate cooperable jaw 44c is also utilized. By resorting to three jaws 44a, 44b and 44c, it will be appreciated that the gripping or clamping action is well distributed. Each jaw 44a, 44b and 44c is formed of a semicircular strip 46 having a gripping tooth 48 on its inner surface. The jaws 44a–c also each include a horizontal web 50.

From FIGURE 6, it can be seen that a vertical pin 52 provides a pivotal axis for the several jaws 44. More specifically, the jaw 44a has a bearing portion 54a integral therewith and the additional jaws 44b and 44c have similar bearing portions 54b and 54c. These bearing portions 54a, 54b and 54c are vertically arrayed one above the other and the pin 52 extends therethrough, there being suitable washers 56 to facilitate the relative pivotal movement that is incorporated into the action of the jaws when gripping or clamping the upper portion of a tree.

In order to actuate the jaws 44a, 44b and 44c, there are hydraulic cylinders 58a and 58b, these cylinders being supplied with fluid under pressure via appropriate tubes 60 which extend downwardly to the vehicle 10 although only the portions of the tubes directly associated with the hydraulic cylinders are shown. It will be seen that two sets or pairs of laterally directed ears 60 are provided at each side of the clamping mechanism, one set of ears 60 being on one side plate 32 and the other set on the other side plate 32. The ears 30 are disposed one above the other and a pin 62 extends through each set or pair. Also, a bearing 64 is integral with each of the hydraulic cylinders 58a and 58b, the pin 62 in each instance passing through such bearing 64. Projecting from the opposite end of each hydraulic cylinder 58a and 58b is a piston rod 66a and 66b, respectively. Owing to the fact that there are two jaws 44a, 44b on one side of the clamping mechanism 30, a bearing 68 on the piston rod 66a fixedly encircles a vertical rod or pin 70 extending between the webs 50 of the jaws 44a, 44b. Hence, when the piston rod 66a is extended from its cylinder 58a, the two vertically arrayed jaws 44a, 44b will be actuated in unison. On the other hand, since there is only one jaw 44c on the other side of the clamping assemblage 30, a clevis 72 is attached to the free end of the piston rod 66b and this clevis 72 engages a relatively short rod or pin 74 passing through the web 50 of the jaw 44c.

As best viewed in FIGURE 5, a sheave or pulley 76 is rotatably carried on a transverse pin 78 extending between the spaced side plates 32. Passing over the sheave 76 is a flexible cable 80 which extends downwardly for the attachment of a delimbing head designated generally by the reference numeral 82.

Attention is directed to FIGURE 7 in which the delimbing head 82 is pictured in greater detail than in FIGURES 1 and 2. From FIGURE 7, it will be seen that the delimbing head 82 includes a curved shoe 84 having an upper knife edge 86a and a lower knife edge 86b. A pair of lugs 88a, 88b are secured to the backside of the shoe 84, as by welding, and these lugs serve as the support for a pair of arcuate arms 90a and 90b. Each arm 90a and 90b carries a curved blade 92 integral therewith which is sharpened to provide upper and lower knife edges 94a and 94b (the latter edge appearing in FIGURES 1 and 2 and being concealed in FIGURE 7). Although not shown in FIGURE 7, the arcuate arms 90a and 90b are biased toward each other so that they hug the tree to be delimbed during the delimbing operation. Actually, the delimbing head can assume a variety of configurations and might be constructed in accordance with the hydraulically actuated arrangement depicated in my copending application which has hereinbefore been identified. For the purpose of rapidly raising the delimbing head 82, the other end of the cable 80 is wound on a winch 94 rotatably supported on a shaft 96 that extends transversely between the side plates 18 on the vehicle 10.

Having mentioned that the boom assembly 20 is comprised in the illustrative situation of seven tubular members or sections 22a–22g, seven additional cables 98 are employed in the extending of these various members or sections 22. More specifically, there is a sheave or pulley 100 rotatably mounted on a bracket 102 at the upper end of each tubular member 22a, 22b, 22c, 22d, 22e and 22f. The lowermost additional cable 98 is wound on a winch 104 mounted for rotation on a shaft 105 that extends between the previously mentioned upstanding side plates 18.

Other than the lowermost tubular member or section 22a, each such member is formed with a longitudinal slot 106, a segment of each of the sheaves 100 projecting therethrough for the purpose of guiding the particular additional cable 98 into the interior of the particular tubular member which is telescopically received in the tubular member immediately subjacent thereto. This can readily be seen from an inspection of FIGURES 3 and 4. The inner end of the cable 98 in each instance is anchored or fixedly secured to a diametrically disposed pin 108, the pin 108 being fixedly mounted internally to its tubular member. The other end of the additional cable 98 in each case is anchored to an externally located bracket 110 which is affixed to the exterior of the tubular member below the one having the sheave 100 thereon that guides the cable. To obviate interference, it will be seen from FIGURES 1 and 3 that the various cables 98 are alternated in position throughout the length of the boom assembly 20, being first on one side and then the other.

Although not actually part of the present invention, it is contemplated that a bottom shear mechanism 112 be utilized. This shear mechanism can correspond to the mechanism illustrated in the copending application that has been hereinbefore alluded to and includes upper and lower plates 114a, 114b. A pair of shear blades 116 are pivotally disposed between the plates 114a and 114b, these shear blades 116 having sharpened cooperable edges so that when actuated toward each other the tree to be delimbed can actually be severed and thereby felled.

As shown in FIGURES 1 and 2, the shear mechanism 112 is mounted at the free end of a pivotal boom 118, the boom 118 being pivotally carried on a shaft 120 that extends between the two side plates 32. By means of a hydraulic cylinder 122 and a piston rod 124 projecting therefrom, it will be understood that the boom 118 can be raised and lowered to place the shear mechanism 112 at the desired height above the ground for severing the tree to be felled. Preferably, an arm 126 is integral with the boom 118 near its free end, the arm 126 inclining upwardly and forwardly so as to serve as a rest or support for the delimbing head 82.

Having presented the foregoing description, it is believed readily apparent how my delimbing apparatus operates. Assuming that a standing tree 128 is to be delimbed, the vehicle 10 is moved into juxtaposition with the tree. The boom assembly 20 can then be extended to whatever length is necessary in order to bring the clamping mechanism 30 to the proper height.

The extension is accomplished by reeling in the particular cable 98 that is connected to the winch 104. Since the other end of the cable 98 that is wound on the winch 104 is attached to the pin 108 affixed within the lower end of the tubular member 22b, it follows that the tubular member 22b is pulled upwardly. It will be recalled that the tubular member 22b is formed with a longitudinal slot 106 to allow entry of the cable 98 into the interior thereof.

What transpires is readily understandable from FIGURE 3. In this regard, the tubular member 22b has telescopically received therein the tubular member 22c. Hence, the sheave 100 on the upper end of the tubular member 22b guides the cable 98 into the interior of the tubular member 22c and exerts an upwardly pulling force on the lower end of the tubular member 22c so as to extend this tubular member outwardly of the tubular member 22b. Also from FIGURE 3, it will be understood that the next above cable 98 does the same thing with respect to the tubular member 22d. This action repeats itself simultaneously throughout the length of the boom assembly 20 with the consequence that all of the tubular members 22b–22g are extended to elevate the clamping mechanism 30 at the end of the upper tubular member 22g to the appropriate height for the particular tree 128.

When the clamping mechanism 30 is raised to the appropriate height, it is then only necessary to actuate the several clamping jaws 44a, 44b and 44c. This is done by means of the two hydraulic cylinders 58a and 58b. Projection under hydraulic pressure of their respective rods 66a and 66b results in the jaws being pivotally moved about their parallel axes defined by the rods or pins 70, 74.

With the jaws 44a, 44b and 44c tightly clamped against the upper portion of the standing tree 128, the delimbing head 82 can then be brought into an encircling relationship with the lower portion of said tree. This is accomplished by lowering the boom 118 which brings into place both the delimbing head 82 and the bottom shear mechanism 112. It will be recalled that a hydraulic cylinder 122 is provided for this purpose. Actually, the particular delimbing head 82 appearing in FIGURE 7 is not self-actuated as far as opening the arms 90a and 90b in order to provide an encircling relationship with the lower portion of the standing tree 128 but it will be appreciated that these arms can be hydraulically operated as in my previously mentioned patent application.

At any rate, when the delimbing head 82 is brought into an encircling relationship with the tree, everything is in readiness for lifting the delimbing head at a rapid speed so as to effect the removal of the various limbs located along the length of the tree 128. To do this, the cable 80 is wound onto the first mentioned winch 94. Inasmuch as the cable 80 is entrained over the sheave 76 at the upper end of the boom assembly 20, the delimbing head 82 is raised quite swiftly and the limbs are severed by virtue of the impact shearing that takes place. More specifically, as the delimbing head 82 is pulled upwardly, the upper knife edge 86a on the shoe 84 acting in concert with the upper edges 94a on the curved blades 92, there being two curved blades 92, causes all of the limbs or branches to be severed. The delimbing head 82 is heavy enough so that when the cable 80 is payed out again to lower the head, the lower knife edges 86b and 94b will provide additional trimming so that even small limbs that might have been flexed inwardly on the upward travel are removed.

While not pictured in the drawings, the clamping mechanism 30 can be equipped with a detopping mechanism so that the upper end of the tree 128 can be severed. The bottom shear mechanism 112, however, is effectual in severing the tree adjacent the ground and this completes the over-all operation.

It is to be appreciated that the telescopically disposed tubular members 22a–g can be quite lightweight, especially since they do not carry a very heavy load. In this regard, the clamping mechanism 30 does not weigh very much and while a sizable amount of reactive force is applied to the delimbing head 82, this is not shouldered by the boom assembly 20 because the clamping mechanism 30 is at this time securely clamped to the upper portion of the tree 128. Consequently, the reactive force is absorbed by the tree itself. After the delimbing action has taken place, the clamping jaws 44a, 44b and 44c can be released by hydraulic retraction of the piston rods 66a and 66b. It will be recognized that this can be done before the base of the tree 128 is severed by the bottom shear mechanism 112. Therefore, it cannot be too strongly emphasized that there is very little load carried by the boom assembly 20 and this allows it to be composed of relatively lightweight tubular members 22a–g which is a decided advantage in harvesting extremely tall trees.

It will, of course, be understood that various changes may be made in the form, details, arrangements and proportions of the parts without departing from the scope of my invention as set forth in the appended claims.

I claim:

1. Delimbing apparatus for tall trees comprising an elongated boom assembly supported at its lower end, a tree clamping mechanism carried at the upper end of said boom assembly, a flexible cable, means at the upper end of said boom assembly for guiding said cable thereover, and a delimbing mechanism attached to one end of said cable, whereby said delimbing mechanism can be raised by pulling on the other end of said cable when said clamping mechanism is clamped to the upper portion of a standing tree.

2. Delimbing apparatus in accordance with claim 1 in which said clamping mechanism includes a pair of arcuate arms, and means for actuating said arms into a tree encircling relationship to cause said upper tree portion to be clamped.

3. Delimbing apparatus in accordance with claim 1 in which said boom assembly includes a plurality of extensible sections.

4. Delimbing apparatus in accordance with claim 3 in which said sections are tubular members mounted for relative telescopic movement with respect to each other.

5. Delimbing apparatus for tall trees comprising a vehicle, a plurality of telescopically related boom sections supported on said vehicle, means for extending said boom sections, a clamping mechanism carried on the uppermost boom section for clamping to the upper portion of a standing tree, a cable having an intermediate portion thereof deflected about said clamping mechanism so that one end extends downwardly along the tree, a delimbing mechanism attached to said one end, and a winch on said vehicle for winding said cable thereon to raise said delimbing mechanism when said clamping mechanism is clamped to the upper portion of the tree to be delimbed.

6. Delimbing apparatus in accordince with claim 5 in which said boom sections are of progressively decreasing diameter, each section having a sheave mounted adjacent its upper end, an additional cable entrained about each sheave with one sheave with one end fixedly attached to the boom section next below and its other end attached to the boom section next above, whereby when the said one end of the lowermost additional cable is pulled to extend the boom section received in the lowermost boom section, the other boom section will be concomitantly extended through the agency of the other additional cables.

7. Delimbing apparatus in accordance with claim 6 in which the tubular sections above said lowermost section each have a longitudinal slot, each additional cable extending to one of said slots so that its said other end may be attached internally.

8. Delimbing apparatus in accordance with claim 7 including a second winch on said vehicle for winding the lowermost additional cable thereon to cause extension of said boom section.

References Cited

UNITED STATES PATENTS

| | | |
|---|---|---|
| 2,777,483 | 1/1957 | Cherem. |
| 2,948,311 | 8/1960 | McCollum. |
| 3,140,736 | 7/1964 | Propst. |
| 3,183,949 | 5/1965 | Larson. |
| 3,183,952 | 5/1965 | Larson. |
| 3,269,436 | 8/1966 | Moore. |

WILLIAM W. DYER, Jr., *Primary Examiner.*

W. D. BRAY, *Assistant Examiner.*